(12) United States Patent
Nagoya et al.

(10) Patent No.: US 12,358,195 B2
(45) Date of Patent: Jul. 15, 2025

(54) MOLDED RESIN PRODUCT, METHOD FOR MANUFACTURING MOLDED RESIN PRODUCT, MOLD, AND APPARATUS FOR MANUFACTURING MOLDED RESIN PRODUCT

(71) Applicant: CANON KABUSHIKI KAISHA, Tokyo (JP)

(72) Inventors: Toshimitsu Nagoya, Kanagawa (JP); Kei Oikawa, Kanagawa (JP); Makoto Kojima, Kanagawa (JP); Takahiro Suzuki, Tokyo (JP); Mao Mukaida, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/507,975

(22) Filed: Nov. 13, 2023

(65) Prior Publication Data

US 2024/0075665 A1    Mar. 7, 2024

Related U.S. Application Data

(63) Continuation of application No. 17/216,393, filed on Mar. 29, 2021, now Pat. No. 11,840,003.

(30) Foreign Application Priority Data

Apr. 7, 2020    (JP) .................................. 2020-069412

(51) Int. Cl.
*B29C 45/26* (2006.01)
*B29C 45/02* (2006.01)
*B29L 31/00* (2006.01)

(52) U.S. Cl.
CPC ............ *B29C 45/263* (2013.01); *B29C 45/02* (2013.01); *B29K 2995/0094* (2013.01);
(Continued)

(58) Field of Classification Search
CPC ..... B29C 45/263; B29C 45/02; B29C 33/424; B29C 45/37; B29C 33/42; B29C 59/02;
(Continued)

(56) References Cited

U.S. PATENT DOCUMENTS 8,440,287 B2 *   5/2013   Shimizu .............. B60R 13/0256
                                                            296/97.7
9,937,675 B2 *   4/2018   Tsubo ..................... B29C 33/56
(Continued)

FOREIGN PATENT DOCUMENTS

CN           107379586 A      11/2017
CN           107776321 A       3/2018
(Continued)

*Primary Examiner* — Brian Handville
(74) *Attorney, Agent, or Firm* — Canon U.S.A., Inc. IP Division

(57) ABSTRACT

A molded resin product includes a plurality of protrusions formed in a predetermined region. A histogram indicating a height distribution of the plurality of protrusions has two peaks having a boundary height as a boundary therebetween. In a case where protrusions having height equal to or smaller than the height Hx are first protrusions and protrusions having height larger than the boundary height are second protrusions among the plurality of protrusions, an arithmetic mean curvature of the first protrusions is smaller than an arithmetic mean curvature of the second protrusions.

18 Claims, 10 Drawing Sheets spec2>spec1

(52) U.S. Cl.
CPC ... *B29L 2031/722* (2013.01); *B29L 2031/764* (2013.01); *B29L 2031/767* (2013.01)

(58) Field of Classification Search
CPC ....... B29K 2995/0094; B29L 2031/722; B29L 2031/764; B29L 2031/767
See application file for complete search history.

(56) References Cited

U.S. PATENT DOCUMENTS

| | | | |
|---|---|---|---|
| 2007/0275213 A1* | 11/2007 | Shimizu | B60R 13/02 428/141 |
| 2013/0236697 A1* | 9/2013 | Walker, Jr. | G02B 1/118 83/13 |
| 2013/0276697 A1* | 10/2013 | Goto | C30B 25/12 118/725 |
| 2017/0029596 A1* | 2/2017 | Kim | C08K 3/32 |
| 2018/0178418 A1* | 6/2018 | Saito | B29C 33/42 |
| 2019/0084200 A1* | 3/2019 | Oikawa | B29C 45/372 |
| 2019/0389110 A1* | 12/2019 | Sano | B29C 45/372 |
| 2020/0031023 A1 | 1/2020 | Nagoya | |
| 2020/0391419 A1* | 12/2020 | Suzuki | B29C 45/0001 |

FOREIGN PATENT DOCUMENTS

| | | |
|---|---|---|
| CN | 108215070 A | 6/2018 |
| EP | 3338982 A1 | 6/2018 |
| JP | 2016104545 A | 6/2016 |

\* cited by examiner spec2＞spec1

R1＞R2

MOLDED RESIN PRODUCT, METHOD FOR MANUFACTURING MOLDED RESIN PRODUCT, MOLD, AND APPARATUS FOR MANUFACTURING MOLDED RESIN PRODUCT

CROSS-REFERENCE TO RELAYED APPLICATIONS

The present application is a continuation of U.S. patent application Ser. No. 17/216,393, filed on Mar. 29, 2021, which claims priority from Japanese Patent Application No. 2020-069412 filed Apr. 7, 2020, which are hereby incorporated by reference herein in their entireties.

BACKGROUND

Field of the Disclosure

The present disclosure relates to a molded resin product whose gloss on the exterior surface thereof is adjusted by providing a fine surface structure, a manufacturing method thereof, and so forth. Particularly, the present disclosure relates to a molded resin product that gives an observer a sense of brilliance.

Description of the Related Art

Highly pleasant design is desired for the exterior surface of resin parts that are used for casings and outer shells of various products. Examples of the various products include electronic devices such as digital cameras and printers. For example, gloss like a mirror surface can be given to the surface of a part by smoothing the surface of the part to provide an aesthetically pleasing glossy exterior, or conversely, a non-glossy texture can be provided by providing fine protrusions and recesses that are visually unrecognizable on the surface of the part.

As one way to improve the texture of or giving pleasant design to the exterior surface of a resin product, coating the exterior surface of a molded product has been performed. However, since the coating is applied on individual molded products, coating is not necessarily suitable for mass production from the viewpoint of uniformity, variation, time, productivity, cost, and so forth.

Therefore, it has been attempted to devise the molding surface of a mold for resin molding to improve the texture of the exterior surface by resin molding without coating.

For example, Japanese Patent Laid-Open No. H09-314569 proposes a method for manufacturing a mold for obtaining an embossed product with improved design and scratch resistance.

In recent years, diversity is desired for product design, and in some cases, luxurious outer surface with a sense of brilliance is desired for particularly improving the design. For example, a texture in which sparkly spots, that is, fine regions having high reflectance, are provided on a matte base in a dispersed manner is preferred as an exterior surface that gives a sense of understated luxury.

As a method for imparting such a sense of brilliance to the exterior surface, a method of coating the outer surface of a molded product with a paint mixed with fine glass beads or metal flakes that have high reflectance and minute sizes is known.

However, as described above, a processing method using coating is not necessarily suitable for mass production from the viewpoint of uniformity, variation, time, productivity, cost, and so forth.

However, by using the mold described in Japanese Patent Laid-Open No. H09-314569, an embossed product in which fine recesses/protrusions are provided in recesses of emboss recesses/protrusions, and smooth protrusion surfaces in which the fine recesses/protrusions are smoothed are formed on the protrusions of the emboss recesses/protrusions, can be manufactured.

However, the outer surface of the embossed product manufactured with the mold disclosed in Japanese Patent Laid-Open No. H09-314569 has a texture completely different from that of an outer surface coated with a paint mixed with fine glass beads or metal flakes, and does not give an observer a sense close to the brilliance that the coated surface gives.

Therefore, it has been desired that a resin product having an outer surface that gives an observer a sense of brilliance similar to that of the case where coating is performed with a paint mixed with fine glass beads or metal flakes is realized by resin molding using a mold.

SUMMARY

According to an aspect of the present disclosure, a molded resin product includes a plurality of protrusions formed in a predetermined region. A histogram indicating a height distribution of the plurality of protrusions has two peaks having a boundary height as a boundary therebetween. In a case where protrusions having height equal to or smaller than the boundary height are first protrusions and protrusions having height larger than the boundary height are second protrusions among the plurality of protrusions, an arithmetic mean curvature of the first protrusions is smaller than an arithmetic mean curvature of the second protrusions.

Further features of the present disclosure will become apparent from the following description of exemplary embodiments with reference to the attached drawings.

DESCRIPTION OF THE EMBODIMENTS

A molded resin product, a manufacturing method for the molded resin product, a mold, a device including the molded resin product, and so forth serving as embodiments of the present disclosure will be described with reference to drawings.

To be noted, the exterior surface of a molded resin product of an embodiment that will be described below is not necessarily limited to a surface that is exposed to the outside of a casing or an outer shell of a device. For example, even if the surface is not always visually recognizable for a user, the surface should be treated as an exterior surface in some cases if the surface is visually recognizable when a door, a hatch, a lid portion, or the like of a device is opened. Therefore, a surface of a resin part or a resin product that can be visually recognized by a user will be sometimes simply referred to as an "outer surface" in the description below.

To be noted, in drawings that will be referred to in the description of embodiments below, it is assumed that elements denoted by the same reference signs have the same functions unless otherwise described.

Molded Resin Product

Figure 1A:
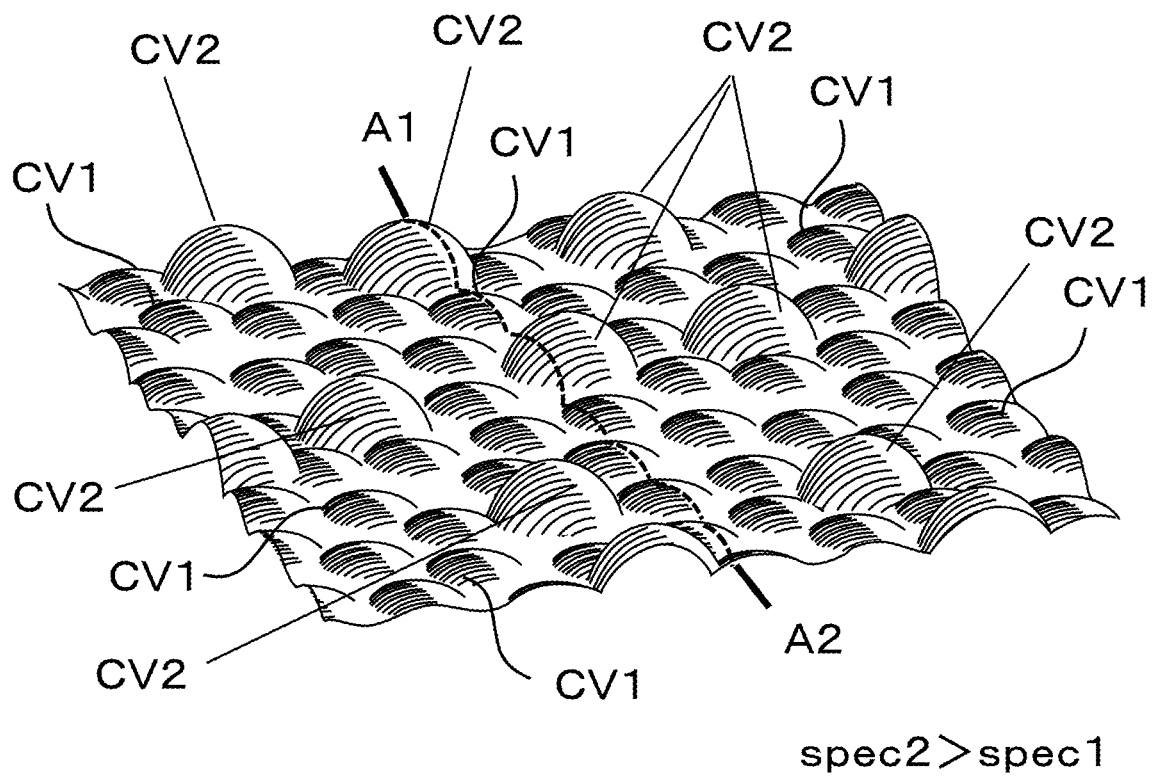
FIG. 1A is an enlarged schematic perspective view of a part of the outer surface of a molded resin product according to an embodiment.
Figure 1B:
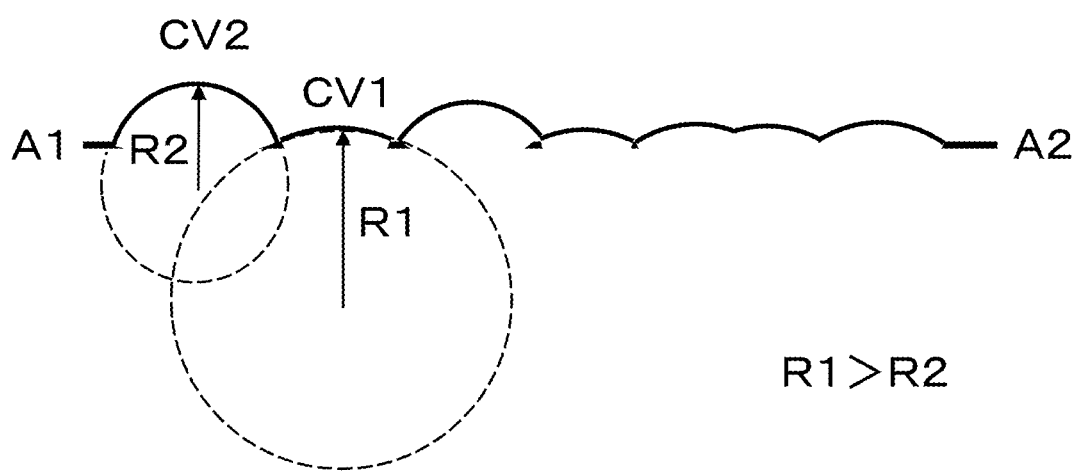
FIG. 1B is a section view taken along a line A1-A2 of FIG. 1A.
Figure 2A:
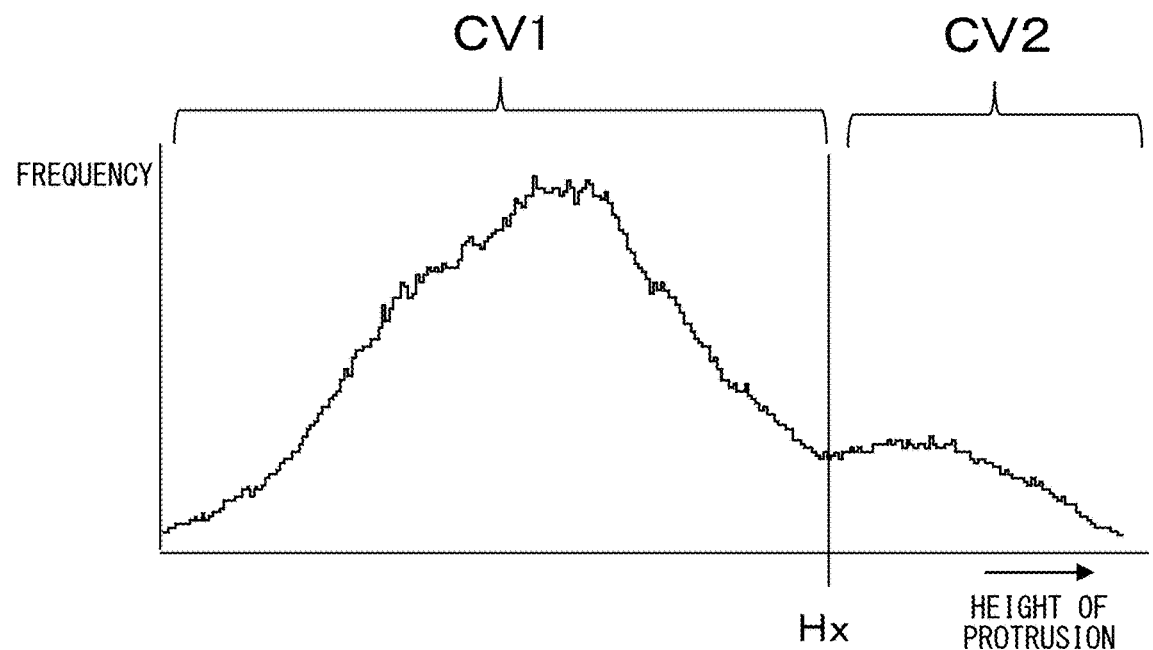
FIG. 2A is a histogram illustrating a height distribution of fine protrusions provided on the outer surface of the embodiment.

The shape of an outer surface of a molded resin product according to an embodiment serving as a predetermined region that gives an observer a sense of brilliance will be described. FIG. 1A is a schematic enlarged perspective view of a part of the outer surface serving as a predetermined region of the molded resin product according to the embodiment, and FIG. 1B is a section view of the outer surface taken along a line A1-A2 of FIG. 1A and illustrating the shape thereof. As illustrated in FIGS. 1A and 1B, many fine protrusions are provided on the outer surface according to the embodiment. FIG. 2A is a histogram illustrating the height distribution of the fine protrusions provided on the outer surface of the embodiment. The vertical axis of the histogram represents the number of the protrusions serving as frequency, and the horizontal axis of the histogram represents the height of the protrusions. In addition, FIG. 2B is a histogram obtained by applying a low-pass filter to the histogram of FIG. 2A and thus removing the fluctuation of the frequency distribution, that is, a high-frequency component.

Figure 2B:
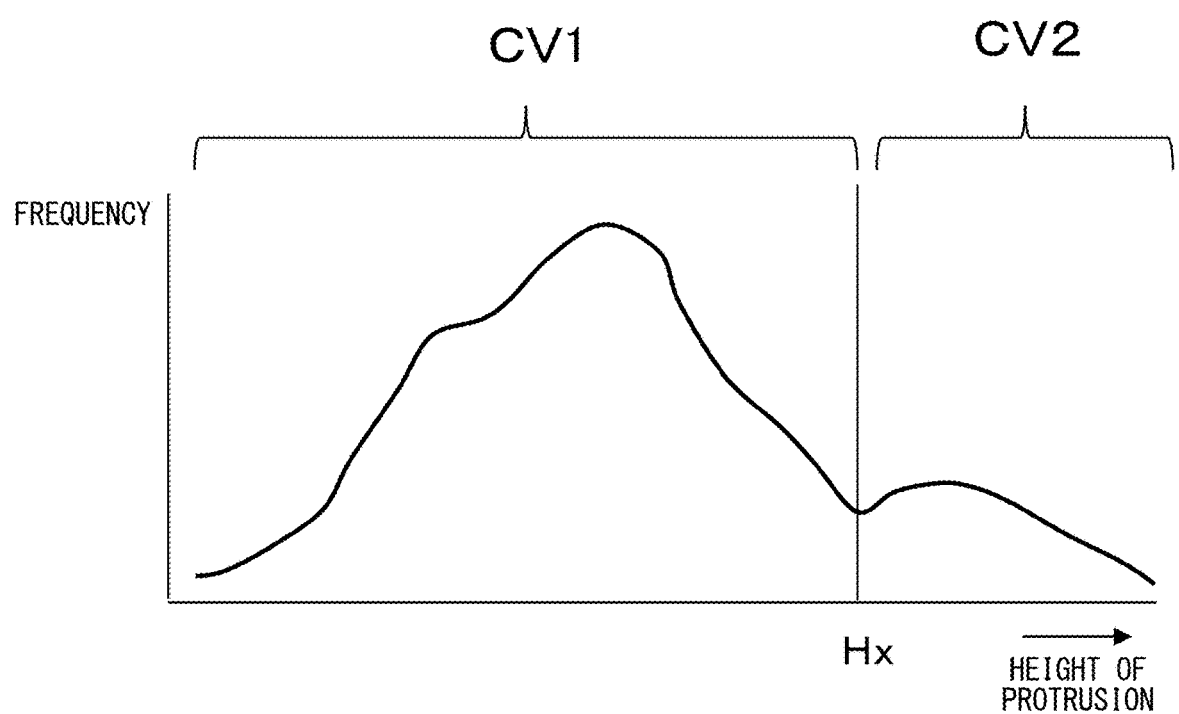
FIG. 2B is a histogram in which fluctuation (high-frequency component) of a frequency distribution is removed.

From FIGS. 2A and 2B illustrating the height distribution of the protrusions provided on the outer surface of the molded resin product of the embodiment, it can be seen that there are two peaks in the histogram. The boundary between the two peaks, that is, the bottom of the valley between the two peaks will be referred to as a height Hx (boundary height), protrusions whose height is equal to or smaller than the height Hx will be collectively referred to as first protrusions CV1, and protrusions whose height is larger than the height Hx will be collectively referred to as second protrusions CV2.

On the outer surface of the molded resin product of the embodiment, a total number N1 of the first protrusions CV1 is larger than a total number N2 of the second protrusions CV2. In addition, as illustrated in FIG. 1A, the second protrusions CV2 are provided in a dispersed manner, and each of the second protrusions CV2 are roughly surrounded by a plurality of the first protrusions CV1. The arrangement density of the first protrusions CV1 per unit area on the outer surface is higher than that of the second protrusions CV2.

Figure 3:
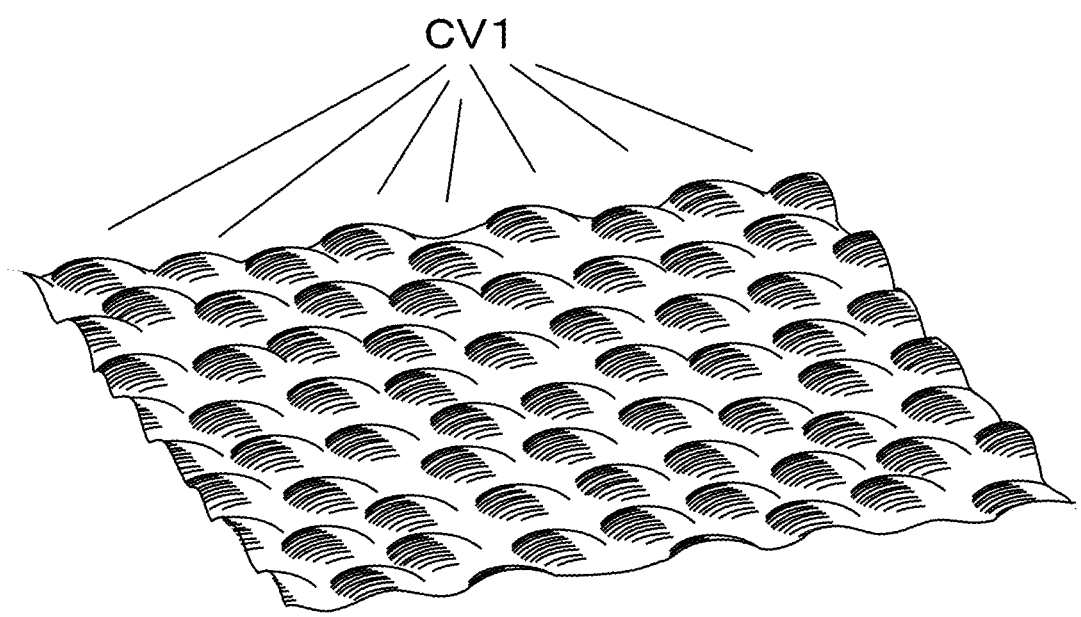
FIG. 3 is an enlarged schematic perspective view of a base surface on which only first protrusions are provided.

Here, FIG. 3 illustrates the outer surface shape of the molded resin product on which only the first protrusions CV1 are provided in the form of a schematic enlarged perspective view for the sake of convenience of description. In the description below, an outer surface on which only the first protrusions CV1 are provided as illustrated in FIG. 3 will be referred to as a base surface for the sake of convenience. The base surface is an embossed surface that visually gives a matte feel. An embossed surface is a surface obtained by forming a fine pattern constituted by recesses and protrusions on the surface of a mold such as a casting mold or a press mold and transferring the pattern onto the molded resin product, and is a non-glossy surface that is not mirror-finished.

The outer surface of the present embodiment has a shape in which the second protrusions CV2 higher than the first protrusions CV1 are provided on the base surface in a dispersed manner. In addition, the radius of curvature of the second protrusions CV2 is smaller than that of the first protrusions CV1. Here, the radius of curvature is a radius of an approximate circle passing through the apex of a protrusion as illustrated in FIG. 1B, and in the case where the radius of curvature of the second protrusions CV2 is R2 and the radius of curvature of the first protrusions is R1, R1>R2 holds. The embodiment of FIG. 1A can be referred to as a shape in which part of the first protrusions CV1 on the base surface of FIG. 3 are replaced by the second protrusions CV2 having a large height and a small radius of curvature. To be noted, if the statistics of the protrusion groups on the outer surface are studied by using the reciprocal number of the radius of curvature as a curvature, the arithmetic mean curvature spc1 of the first protrusions CV1 is smaller than the arithmetic mean curvature spc2 of the second protrusions CV2, and spc2>spc1 holds.

The molded resin product of the present embodiment having an outer surface of such a shape can give an observer a sense of brilliance similar to that of a surface coated with a paint mixed with fine glass beads or metal flakes. In the case of the coating, the sense of brilliance in which sparkly spots, that is, fine regions of high reflectance are provided on a matte base in a dispersed manner is realized by dispersing glass beads or metal flakes having high reflectance in a non-glossy paint and utilizing the difference in reflectance between materials.

In contrast, in the outer surface of the present embodiment, the sense of brilliance in which sparkly spots, that is, fine regions of high reflectance are provided on a matte base in a dispersed manner is realized by devising the shapes of the protrusions formed on the outer surface by molding instead of using the difference in reflectance between different materials.

Since light is reflected such that the incident angle and the reflection angle are equal, the angle distribution of the reflection light is wider when the range of the angle distribution of the normal to the incident surface is wider, such as in the case where the incident surface is a curved surface. For example, if light is incident on a perfect flat surface such as a mirror surface at a certain incident angle, the light is reflected only in a direction of a certain reflection angle. In contrast, in the case where the incident surface is an uneven surface, the reflection angle is distributed in various directions.

In addition, in typical interfacial reflection, the intensity of the reflection light is higher when the incident angle is larger. That is, when the surface has undulation, the diffusibility of the reflection light increases, and there is an angle in which the reflection intensity is high.

The base surface on which the first protrusions CV1 having a relatively large radius of curvature diffuses light more than a flat surface or a mirror surface, and therefore gives a matte feel. In addition, by providing the second protrusions CV2 having a larger height and smaller radius of curvature than the first protrusions CV1 on the base surface in a dispersed manner, a sense of brilliance in which sparkly spots are dispersed in a matte background can be realized.

The intensity of a mirror reflection component is controlled by forming the base surface as an embossed surface including a portion having a large radius of curvature. Further, by providing protrusions having a larger height and smaller radius of curvature than the base surface on the base surface in a dispersed manner, sparkly spots that have higher reflection intensity and diffuses light to a wider range of angles are imparted to the base surface. Due to the difference in the reflection intensity characteristic and the diffusion angle characteristic between the base surface and the sparkly spots, a sense of brilliance in which reflection changes depending on the viewing angle can be realized.

The shape of the outer surface of the molded resin product according to the embodiment can be appropriately set in accordance with a sense of brilliance to be imparted within such a range that the molded resin product can be reproducibly manufactured by molding using a mold. For example, in the case where the ratio of the area occupied by the second protrusions CV2 on the outer surface is lower than 5% in plan view, the number of sparkly spots is too small, the reflection intensity is too low, and thus the sense of brilliance cannot be sufficiently obtained, and therefore it is preferable that the ratio of the area occupied by the second protrusions CV2 on the outer surface is 5% or higher. Meanwhile, in the case where the ratio of the area occupied by the second protrusions CV2 is higher than 40% in plan view, the number of sparkly spots is too large and the contrast difference between the base surface and the sparkly spots becomes insufficient. The sense of brilliance given to the observer is lowered in this case, and therefore the area occupied by the second protrusions CV2 is preferably 40% or lower of the area of the outer surface.

In addition, regarding the surface roughness of the region where only the first protrusions CV1 are formed on the outer surface, a spc value is preferably equal to or larger than 10 [1/mm] and equal to or smaller than 30 [1/mm], and a sdr (developed interfacial area ratio) value is preferably equal to or larger than 0.001 and equal to or smaller than 0.015.

Here, the spc value is the arithmetic mean curvature of ridge lines passing through the apices of protrusions, that is, an average value of the reciprocal numbers of radiuses of approximate circles of the ridge lines passing through the apices of the protrusions, and is represented by the following formula (1). In this formula (1), x and y represent a position on the outer surface in the coordinate system in plan view, z represents a height direction component of a protrusion at this position, and n represents the number of apices of the protrusions. This value being small indicates that the shape of the protrusions is not steep and is wide spread, and this value being large indicates that the shape of the protrusions is sharp and narrow.

$$Spc = -\frac{1}{2}\frac{1}{n}\sum_{k=1}^{n}\left(\frac{\partial^2 z(x, y)}{\partial x^2} + \frac{\partial^2 z(x, y)}{\partial y^2}\right)$$ Formula (1)

In the case where the arithmetic mean curvature spc of the base surface is smaller than 10 [1/mm], the base surface is approximately a flat surface, and reflection close to mirror reflection occurs depending on how the light is incident. Meanwhile, in the case where the arithmetic mean curvature spc of the base surface is larger than 30 [1/mm], the diffusibility and reflection intensity of the base surface increase, thus the contrast difference between the base surface and the second protrusions CV2 serving as sparkly spots becomes insufficient, and the sense of brilliance cannot be obtained.

In addition, sdr is a developed interfacial area ratio, and is represented by the following formula (2). In the formula (2), x and y represent a position on the outer surface in the coordinate system in plan view, z represents a height direction component of a protrusion at this position, and A represents the area of a definition region. Therefore, the developed interfacial area ratio sdr indicates how large the surface area is with respect to the area of the definition region.

$$Sdr = \frac{1}{A}\left[\iint_A \left(\sqrt{1 + \left(\frac{\partial z(x, y)}{\partial x}\right)^2 + \left(\frac{\partial z(x, y)}{\partial y}\right)^2} - 1\right)dxdy\right]$$ Formula (2)

The value of the interfacial developed area ratio sdr being small indicates that the outer surface is close to a flat surface, and the value of sdr being large indicates that many steep surfaces are present.

In the case where the sdr of the base surface is smaller than 0.001, the base surface is approximately a flat surface, and reflection close to mirror reflection occurs depending on how the light is incident. Meanwhile, in the case where the sdr of the base surface is larger than 0.015, the diffusibility and reflection intensity of the base surface increase, thus the contrast difference between the base surface and the second protrusions CV2 serving as sparkly spots becomes insufficient, and the sense of brilliance cannot be obtained.

In addition, in the case where the shape of the second protrusions CV2 serving as sparkly spots are statistically studied, the spc value is preferably equal to or larger than 15 [1/mm] and equal to or smaller than 100 [1/mm], and the sdr value is preferably equal to or larger than 0.020 and equal to or smaller than 0.080.

In the case where the spc of the second protrusions CV2 serving as sparkly spots is smaller than 15 [1/mm], the reflection intensity of the sparkly spots is too low to obtain sufficient contrast difference from the base surface and thus obtain a sufficient sense of brilliance. Meanwhile, in the case where the spc of the second protrusions CV2 serving as sparkly spots is larger than 100 [1/mm], the diffusion range of the sparkly spots increase, and the function as sparkly spots deteriorates. In the case where the sdr value of the second protrusions CV2 serving as sparkly spots is smaller than 0.020, the difference between diffusion on the sparkly spots and diffusion on the base surface becomes too small to obtain a sufficient sense of brilliance. Meanwhile, in the case where the sdr value of the second protrusions CV2 serving as sparkly spots is larger than 0.080, although the diffusion and reflection intensity of the sparkly spots increase, the reflection intensity becomes too high, which makes the observer feel a strong sense of granularity from the sparkly spots. In this case, the granularity of the external appearance is exaggerated too much, and an intended texture cannot be necessarily obtained.

In addition, the ratio of spc between the first protrusions CV1 serving as the base surface and the second protrusions CV2 serving as sparkly spots is preferably 1.5 or higher and 10.0 or lower. In the case where the ratio is lower than 1.5, the contrast difference between the base surface and the sparkly spots is too small to obtain a sufficient sense of brilliance. In the case where the ratio is higher than 10.0, each sparkly spot becomes small, thus the intensity of the reflection light from the sparkly spots decreases, and it becomes impossible to sufficiently function as sparkly spots. According to experiments conducted by the inventors, the ratio of spc between the first protrusions CV1 serving as the base surface and the second protrusions CV2 serving as sparkly spots is particularly preferable within the range from 3 to 8.

Figure 4:
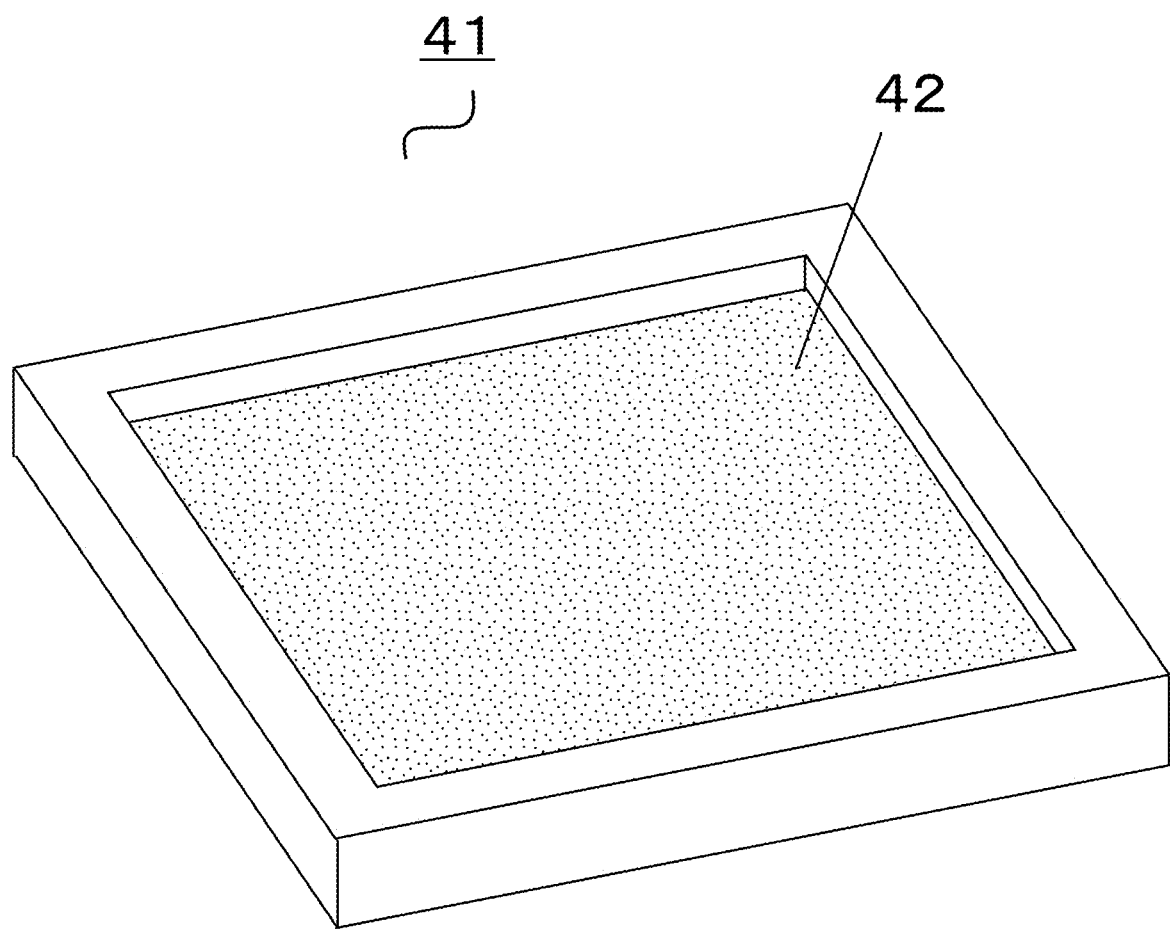
FIG. 4 is a schematic perspective view of an example of the molded resin product of the embodiment.

Next, FIG. 4 is a perspective view of an example of the molded resin product according to the embodiment illustrating an outer appearance thereof. The first protrusions CV1 and the second protrusions CV2 described above are formed on a surface region 42 of a molded resin product 41 for imparting a sense of brilliance. To be noted, since the first protrusions CV1 and the second protrusions CV2 are very small, FIG. 4 illustrates these by adding a simple texture in the surface region 42 for the sake of convenience of illustration.

Next, the outer surface shape of the surface region 42 will be described in more detail.

Figure 5:
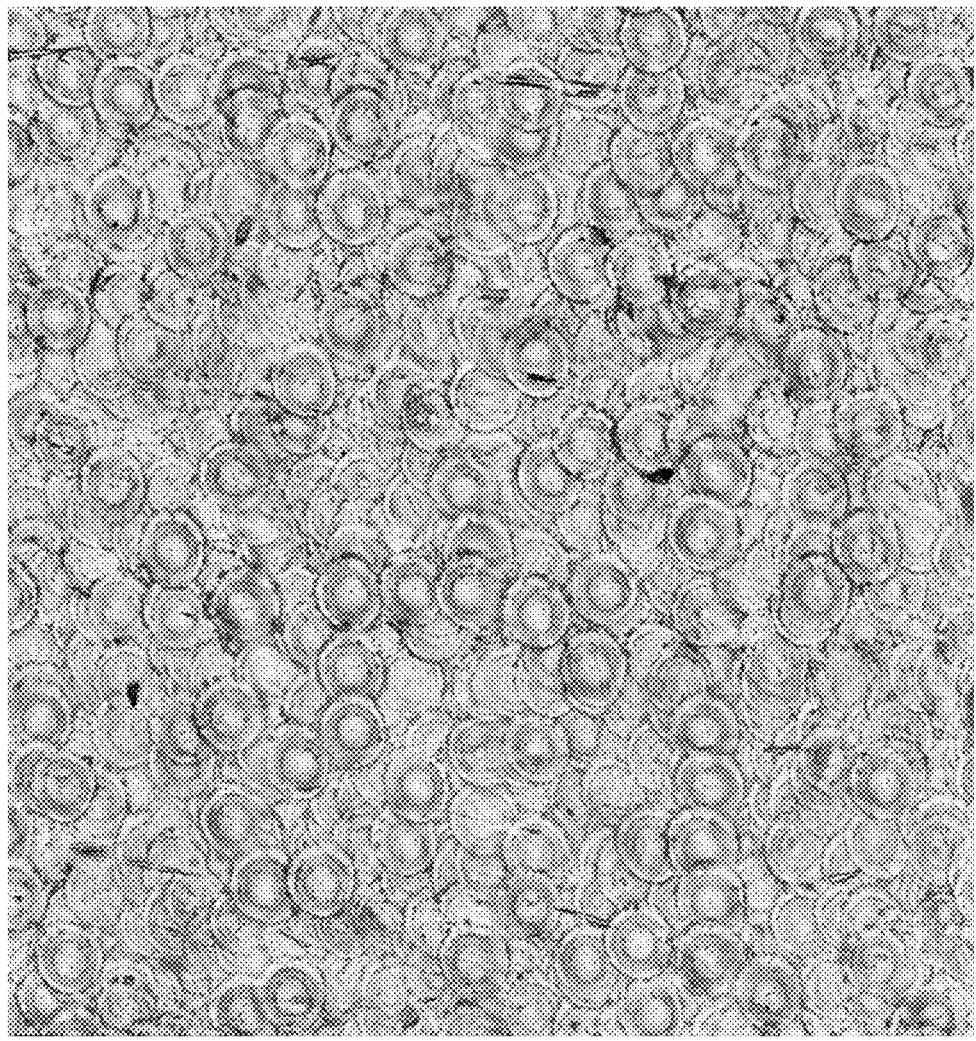
FIG. 5 is a diagram illustrating results of observation of the outer surface of the molded resin product according to the embodiment by using a laser microscope.

FIG. 5 illustrates results of observation of the outer surface of the molded resin product according to the embodiment by using a laser microscope. The laser microscope used herein is one of 3D laser scanning confocal microscope VK-X series manufactured by KEYENCE. FIG. 5 illustrates a microscopic image obtained by combining data obtained by 24 measurements in total constituted by measurements on four rows and six columns performed using a 50× microscope lens. To be noted, the histogram illustrated in FIG. 2A is a height distribution of the outer surface from which the observation result of FIG. 5 was obtained. Therefore, the first protrusions CV1 and the second protrusions CV2 can be each extracted from the image of FIG. 5 by obtaining the height Hx described with reference to FIGS. 2A and 2B. If the first protrusions CV1 and the second protrusions CV2 are obtained, the spc and sdr can be obtained for each of the first protrusions CV1 and the second protrusions CV2 by using a multi-file analysis application provided with the laser microscope. In the molded resin product of the embodiment, the spc value of the second protrusions CV2 serving as sparkly spots was 80.2, the sdr value of the second protrusions CV2 was 0.045, the spc value of the first protrusions CV1 serving as the base surface was 12.3, and the sdr value of the first protrusions CV1 was 0.004.

Figure 6:
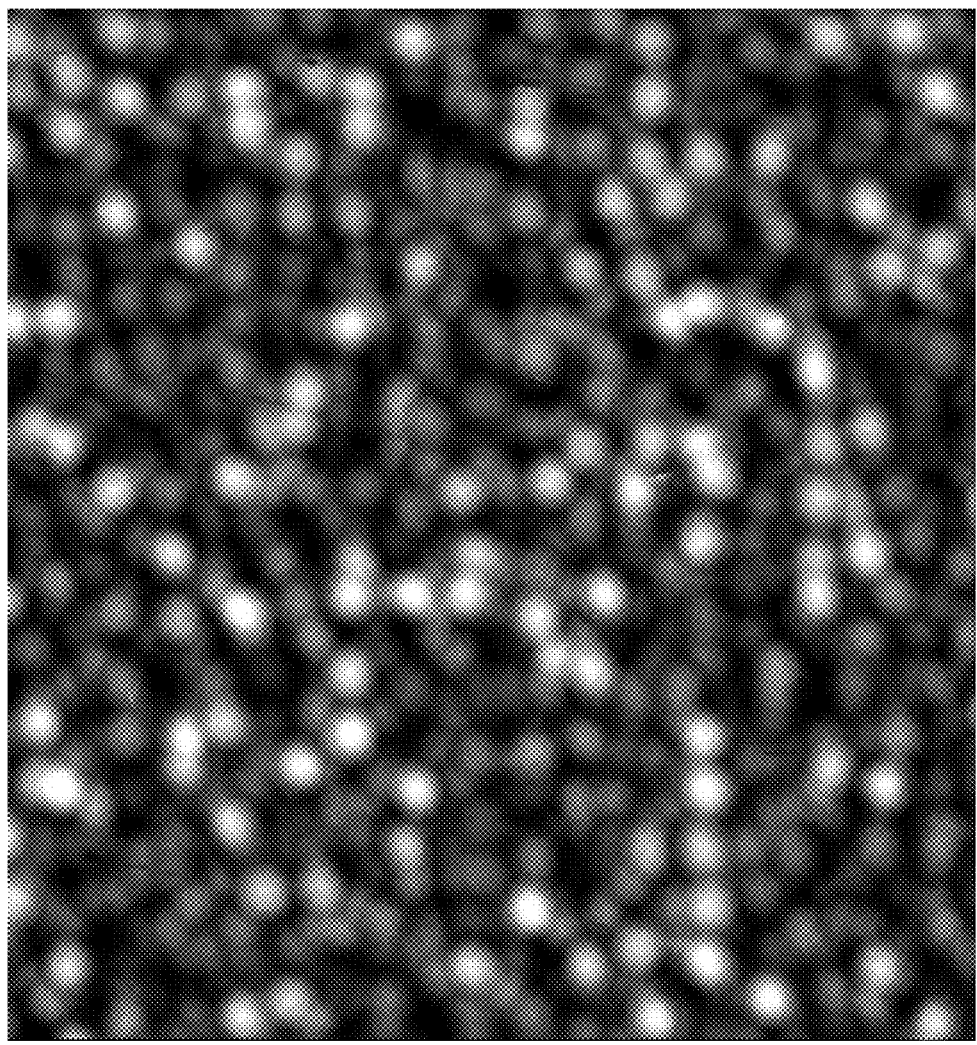
FIG. 6 is a monochromatic image expressed by standardizing the height distribution of the protrusions and converting the height into shades (gradation).

FIG. 6 illustrates a monochromatic image in which height is expressed by standardizing the height distribution of the large number of protrusions formed on the outer surface and converting the height into the shade, or gradation of the image, and a lighter color, that is, a color closer to white indicates that the height of the protrusion is larger.

Figure 7:
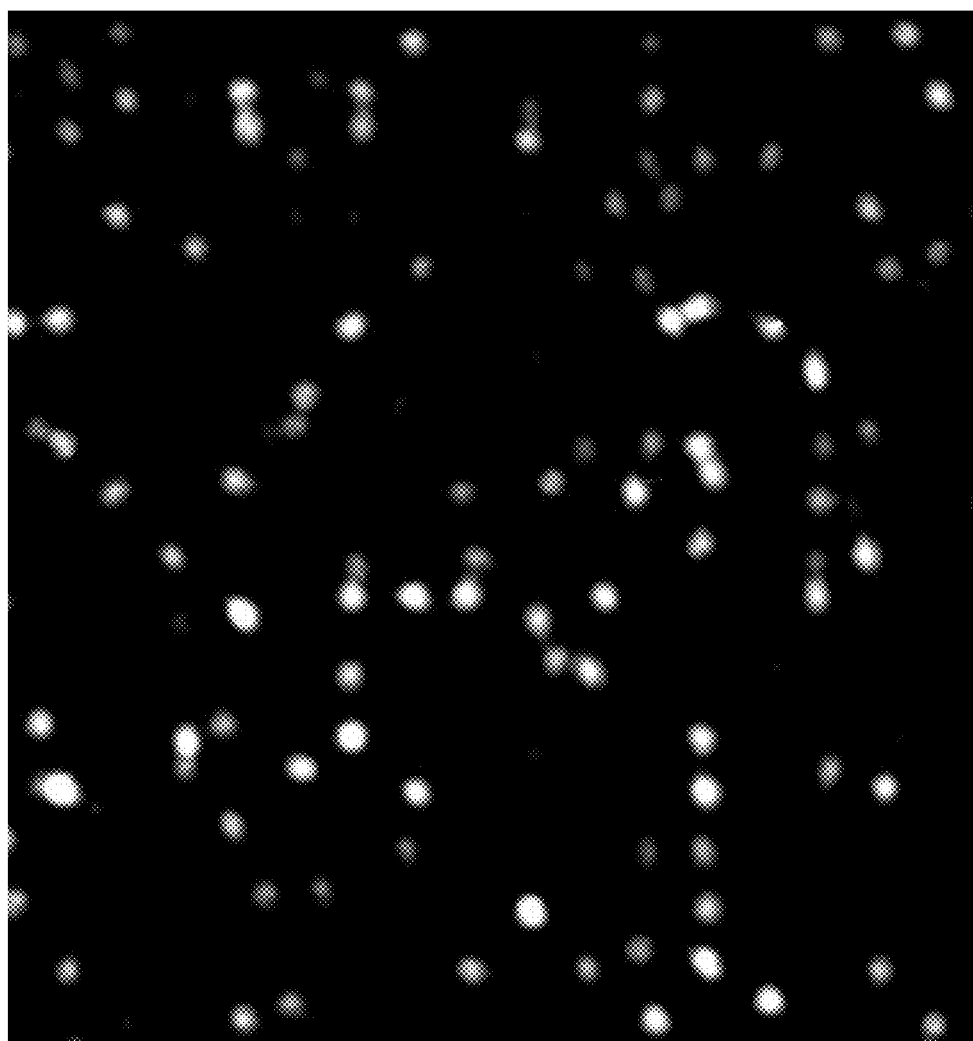
FIG. 7 is a black and white binary image in which second protrusions are expressed by white and the other parts are expressed by black.

FIG. 7 illustrates a black/white binary image in which the second protrusions CV2 are expressed by white and the other parts are expressed by black. That is, FIG. 7 illustrates a black/white binary image representing the first protrusions CV1 and the second protrusions CV2 distinguished by the method described with reference to FIGS. 2A and 2B. In other words, the white part represents the sparkly spots, and the black part represents the base surface. The occupying area ratio of the second protrusions CV2 in the outer surface that gives an observer a sense of brilliance, or an area ratio of sparkly spots to the base surface can be obtained by obtaining the area of each of the white part and the black part. To be noted, the occupying area ratio of the second protrusions CV2 serving as sparkly spots in the outer surface was 14%.

As described above, in the molded resin product according to the present embodiment, the sense of brilliance in which sparkly spots, that is, fine regions having high reflectance, are provided on a matte base in a dispersed manner is realized by devising the shape of protrusions formed on the outer surface by molding using a mold instead of using the difference in reflectance between different materials.

Mold

Next, a mold for forming the first protrusions CV1 and the second protrusions CV2 described above on the outer surface of a resin material will be described in detail. First recesses for forming the first protrusions CV1 on the resin and second recesses for forming the second protrusions CV2 on the resin are defined in the molding surface of the mold.

As the material for the mold, for example, a material suitable for reproducibly transferring fine shapes onto the resin, such as stainless steel or aluminum, can be used. In the molding surface of the mold, recesses for forming the first protrusions CV1 and the second protrusions CV2 described above by transfer are defined, that is, a reverse mold is formed. Although such recesses can be defined by cutting, blasting, etching, and the like in principle, it is particularly preferable that the recesses are defined by laser processing for defining fine recesses with high precision in a short time.

Figure 8:
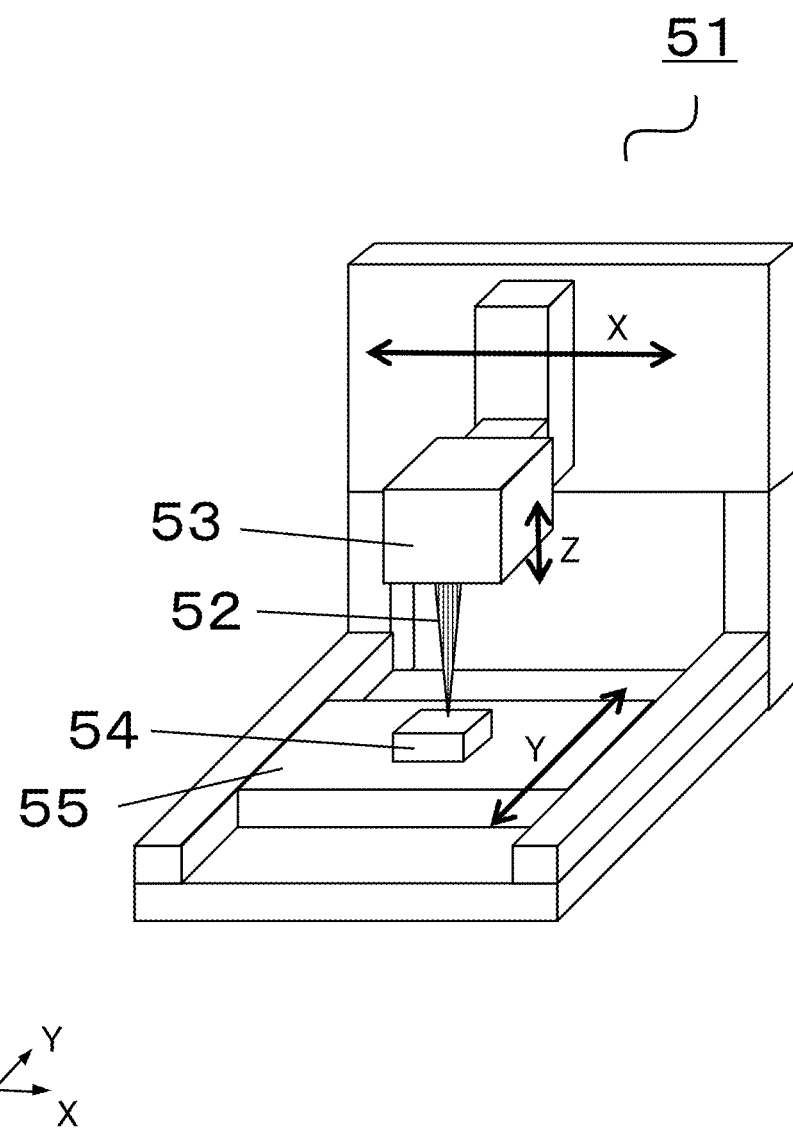
FIG. 8 is a diagram for describing a method for manufacturing a mold according to the embodiment by using a laser processing machine.

FIG. 8 is a diagram for describing a method for manufacturing the mold according to the embodiment by using a laser processing machine. A laser processing machine 51 includes a laser head 53 capable of emitting laser light 52 for processing, and a processing stage 55 on which a mold block 54 serving as a processing target object can be placed. The relative positions of the laser head 53 and the mold block 54 can be changed by an X-axis movement mechanism, a Y-axis movement mechanism, and a Z-axis movement mechanism, and thus the laser light 52 for processing can be radiated onto an arbitrary position on the mold block 54.

The laser light emitted from the laser head 53 is converged by an unillustrated optical system and focused onto a predetermined focus position. Therefore, when radiating laser light onto a processing region, the movement mechanisms of respective axes are driven so as to maintain a state in which the laser head 53 and an irradiated point are always separated from each other by a focal length. In addition, as one method for reducing the irradiation energy density for controlling the processed shape such as the curvature and depth of the recesses, laser irradiation may be performed while maintaining a defocused state in which the distance between the laser head 53 and the irradiated point is deviated from the focal length by a certain amount.

The laser head 53 includes a two-axis galvano scanner and an fθ lens, and can scan an irradiation position at a high speed by driving the galvano mirror. The scanning by the galvano mirror can be performed more quickly than the driving of the stage, and therefore controlling the irradiation position by moving the stage in combination with the scanning by the galvano mirror is advantageous from the viewpoint of reducing the processing time.

As a laser light source for laser processing, a continuous wave laser: CW laser that performs continuous irradiation, a pulse laser that repeats irradiation of a short time, and so forth can be used. In the present embodiment, a laser light source having a pulse width of a nanosecond order is preferably used. A laser for which conditions such as the irradiation intensity, pulse length, and pulse interval can be arbitrarily selected is preferably used, and for example, a nanosecond pulse laser manufactured by AMPLITUDE SYSTEMS can be used as a laser oscillator. In the embodiment, the wavelength of the laser light for processing generated by the nanosecond pulse laser oscillator is set to 1030 nm, the pulse width is set to 30 nanoseconds, and the average output is set to 15 W.

The laser irradiation is performed by setting irradiation conditions in accordance the shapes of the first recesses and the second recesses for transferring the first protrusions CV1 and the second protrusions CV2 onto the resin material, and thus a large number of recesses are defined in the surface of the mold.

Manufacturing Method

Next, a method for manufacturing a molded resin product in the embodiment by using the mold described above will be described. FIGS. 9A to 9E are schematic diagrams for describing the manufacturing process for manufacturing the molded resin product according to the embodiment by using an injection molding machine.

Figure 9A:
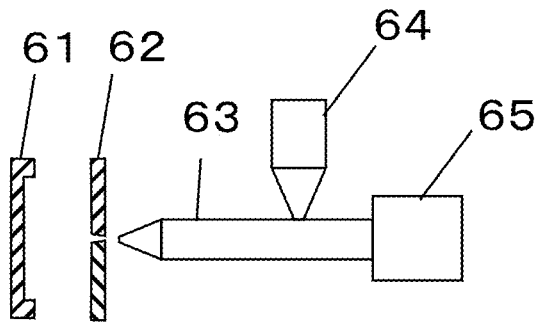
FIG. 9A is a diagram illustrating the setup of an injection molding apparatus.

FIG. 9A is a schematic diagram illustrating the setup of an injection molding apparatus, and illustrates molds 61 and 62, a cylinder 63 for injecting resin into a mold, and a hopper 64 for charging a resin material into the cylinder 63. The first recesses and the second recesses for transferring the first protrusions CV1 and the second protrusions CV2 onto the resin material are defined in the molding surface of the mold 61 and/or the mold 62. In the present embodiment, a reinforced polycarbonate resin which is colored black and in which about 30% of glass filler is mixed is used as the resin material.

The cylinder 63 includes an unillustrated screw therein, and the resin material is conveyed to the distal end of the cylinder 63 by rotating the screw by a motor 65. In addition, the cylinder 63 is provided with an unillustrated heater, and a solid resin material charged from the hopper 64 melts by being heated to a temperature equal to or higher than the melting point thereof while being conveyed to the distal end of the cylinder 63, and is reserved in a space in the distal end portion of the cylinder 63.

Figure 9B:
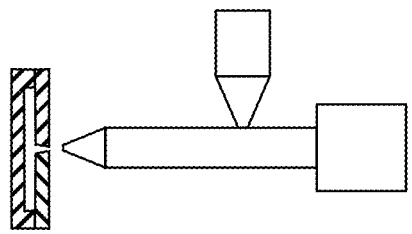
FIG. 9B is a diagram illustrating a mold clamping step.

Next, a mold clamping step illustrated in FIG. 9B is performed. The molds 61 and 62 are positioned by an unillustrated moving mechanism, and are then closed to form a cavity. In addition, the molds 61 and 62 are heated by an unillustrated heater. Typically, a channel for flowing a high-temperature liquid is defined in the molds, and the temperature of the molds is adjusted by controlling the flow rate and temperature of the liquid. To be noted, the heating temperature of the molds in this step will be referred to as a mold temperature.

Figure 9C:
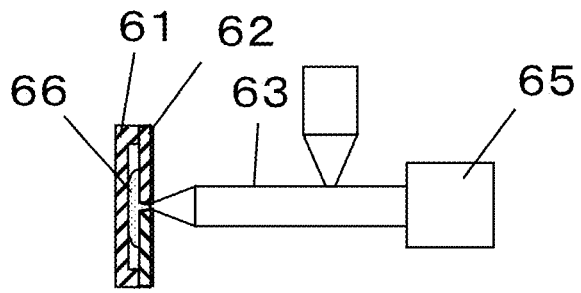
FIG. 9C is a diagram illustrating an injection step.

Sequentially, an injection step illustrated in FIG. 9C is performed. A nozzle at the distal end of the cylinder 63 is pressed against an injection hole portion provided in the mold 62. Then the motor 65 operates to rotate the unillustrated screw, and thus a molten resin 66 is injected into the cavity defined by the molds 61 and 62. To be noted, the temperature of the molten resin 66 in this step will be referred to as a resin temperature.

Figure 9D:
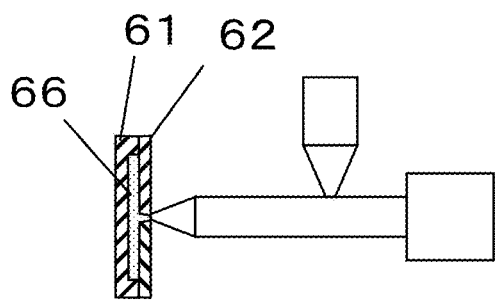
FIG. 9D is a diagram illustrating a pressure keeping step and a cooling step.

Sequentially, a pressure keeping step and a cooling step illustrated in FIG. 9D are performed. In the pressure keeping step, the pressure applied to the molten resin 66 injected into the cavity is maintained at a predetermined value by controlling the oil pressure in the cylinder 63. To be noted, this pressure of the predetermined value will be referred to as a dwell pressure. To be noted, as the dwell pressure, various values that allow the molten resin 66 to fill all the corners in the space in the cavity can be selected. That is, the dwell pressure of an appropriate value is applied to the molten resin 66 such that resin is injected into and around the recesses and protrusions of the molding surface of the molds with no gaps such that the first protrusions CV1 and the second protrusions CV2 are formed with high shape precision.

In the cooling step subsequent to the pressure keeping step, the molds 61 and 62 are cooled by an unillustrated cooling mechanism in the arrangement illustrated in FIG. 9D, such that the resin inside the cavity is cooled to a temperature equal to or lower than the glass transition temperature of the resin and is thus solidified. As the cooling mechanism, for example, a method of providing a channel for refrigerant around the molds and cooling the molds by circulating a refrigerant can be used.

Figure 9E:
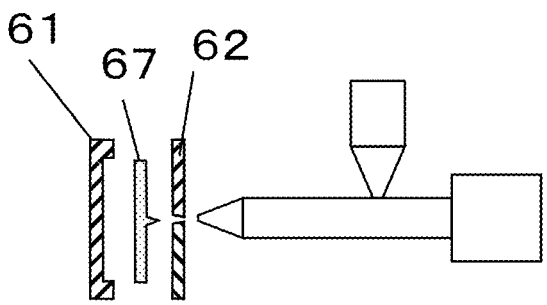
FIG. 9E is a diagram illustrating a mold opening step and a mold releasing step.

After the resin inside the cavity is solidified, the mold opening step and the mold releasing step illustrated in FIG. 9E are performed. First, in the mold opening step, the mold 61 and/or the mold 62 is moved by an unillustrated driving mechanism to separate the molds 61 and 62 from each other.

In the subsequent mold releasing step, a molded resin product 67 adhering to one of the molds is separated from the mold by, for example, projecting an unillustrated ejector pin. To be noted, a gate trace, which is a burr left at the position of the injection gate, formed on the molded resin product 67 that has been taken out may be removed if necessary.

According to the manufacturing method described above, in the present embodiment, a molded resin product on the outer surface of which the first protrusions CV1 and the second protrusions CV2 are formed with high shape precision can be manufactured.

Other Embodiments

To be noted, the present disclosure is not limited to the embodiment described above, and various modifications and combinations are possible within the technical concept of the present disclosure.

For example, the method for forming the first protrusions CV1 and the second protrusions CV2 is not limited to the injection molding method described above, and transfer molding methods of various types that transfer the shape of the mold surface onto the resin material can be used. For example, the first protrusions CV1 and the second protrusions CV2 can be formed on the resin by an appropriate transfer method such as roller molding or press molding.

In addition, the molded resin product according to the embodiment is not limited to the example illustrated in FIG. 4. According to the present disclosure, the sense of brilliance can be imparted to molded resin products of various shapes and functions.

Figure 10A:
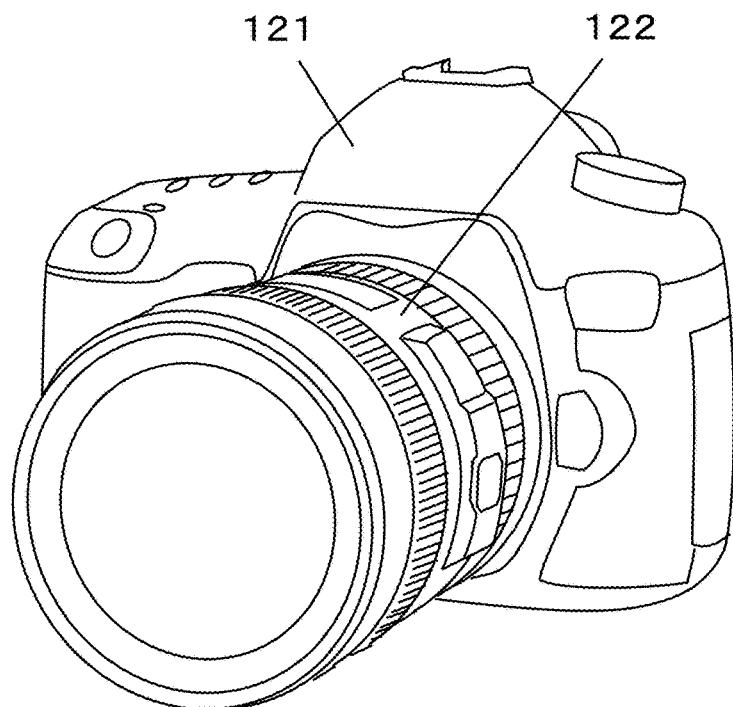
FIG. 10A is an exterior view of a camera including the molded resin product according to the embodiment.
Figure 10B:
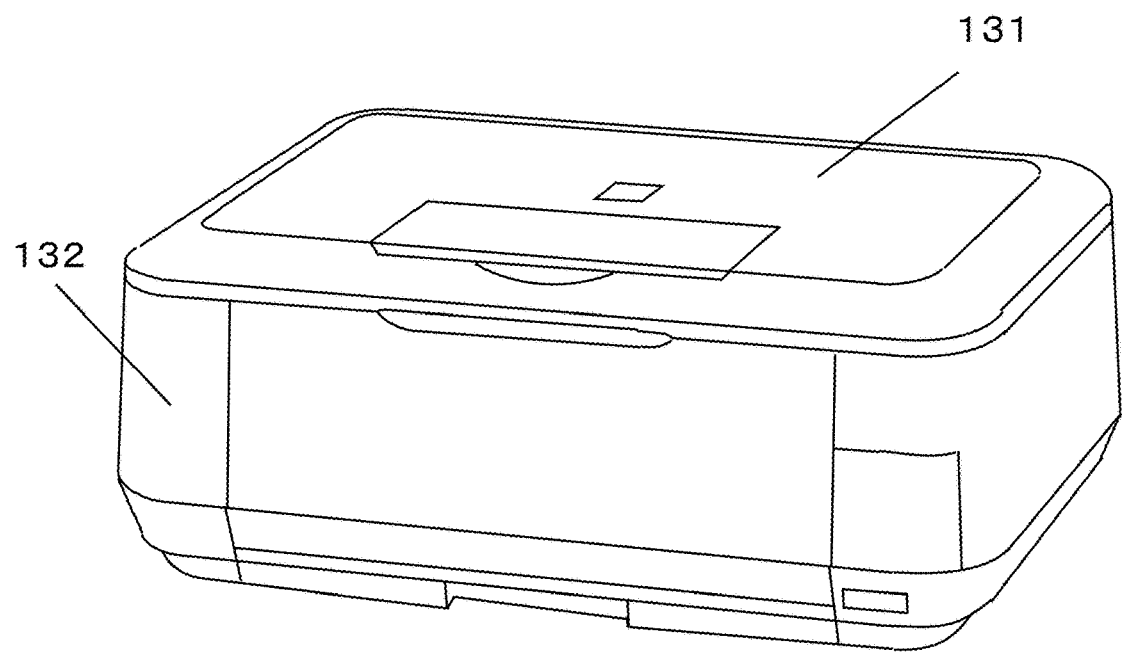
FIG. 10B is an exterior view of a printer including the molded resin product according to the embodiment.

For example, the sense of brilliance can be imparted to an exterior part 121 of a camera body of a camera illustrated in FIG. 10A or an exterior part 122 of a lens barrel of the camera. Alternatively, the sense of brilliance can be imparted to, for example, an exterior part 131 of a top board of a printer illustrated in FIG. 10B or an exterior part 132 of a side surface of the printer. To be noted, examples of the camera are not limited to the example illustrated in FIG.

10A, and include interchangeable-lens single reflex cameras, mirrorless cameras, compact cameras, and smartphones having an image capturing function. In addition, examples of the printer are not limited to the example illustrated in FIG. 10B, and include various embodiments such as apparatuses having only printing functions, copiers, and multi-functional apparatuses having reading functions. Examples of the recording system are not particularly limited and include an electrophotographic system, an inkjet system, and a thermal transfer system.

Further, the present disclosure is applicable to not only molded resin products for cameras and printers but also to any molded resin products for which it is desired that the observer visually recognizes the sense of brilliance such as interior parts of cars and outer boxes of cosmetics. The molded resin product may have a thin flat plate shape like a sheet or a film or a three-dimensional shape with a curved surface, or may have flexibility.

As a main component of the resin material used for the molded resin product, for example, thermoplastic resins such as polyethylene, polystyrene, polypropylene, polyvinyl chloride, polyester, polyamide, and polycarbonate can be preferably used, but the main component is not limited to these. In addition, although it is preferable that a resin material that is not transparent is used because the sense of brilliance is imparted by using surface reflection, the color is not limited. The resin material can be colored as desired by mixing an appropriate pigment or the like in the resin material. In addition, the present disclosure is also applicable to reinforced resins obtained by adding glass filler or carbon filler in resin, functional resins such as conductive resins, and so forth.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A molded resin product comprising:
    a plurality of protrusions formed in a predetermined region, wherein:
        the plurality of protrusions includes first protrusions and second protrusions,
        the first protrusions are uniformly arranged to form a base surface,
        the second protrusions are arranged on the base surface in a dispersed manner,
        the second protrusions have a larger height and smaller radius of curvature than the first protrusions, and
        each of the second protrusions is roughly surrounded by a plurality of the first protrusions.
2. The molded resin product according to claim 1, wherein, in the predetermined region, an arrangement density of the first protrusions is higher than an arrangement density of the second protrusions.
3. The molded resin product according to claim 1, wherein, in the predetermined region, an area occupied by the first protrusions is larger than an area occupied by the second protrusions.
4. The molded resin product according to claim 1, wherein the second protrusions occupy an area of 5% to 40% of the predetermined region.
5. The molded resin product according to claim 1, wherein an arithmetic mean curvature of the first protrusions is 10 [1/mm] or larger and 30 [1/mm] or smaller.
6. The molded resin product according to claim 1, wherein an arithmetic mean curvature of the second protrusions is 15 [1/mm] or larger and 100 [1/mm] or smaller.
7. The molded resin product according to claim 1, wherein a ratio of an arithmetic mean curvature of the second protrusions to an arithmetic mean curvature of the first protrusions is 1.5 or higher and 10.0 or lower.
8. The molded resin product according to claim 1, wherein a developed interfacial area ratio of the first protrusions is 0.001 or higher and 0.015 or lower.
9. The molded resin product according to claim 1, wherein a developed interfacial area ratio of the second protrusions is 0.020 or higher and 0.080 or lower.
10. The molded resin product according to claim 1, wherein the second protrusions include a first second-protrusion and a second second-protrusion, and
    wherein the first protrusions are provided between the first second-protrusion and the second second-protrusion.
11. The molded resin product according to claim 1, wherein the second protrusions include a first second-protrusion and a second second-protrusion, and
    wherein the first second-protrusion and the second second-protrusion are in contact with each other.
12. The molded resin product according to claim 1, wherein the first protrusions and the second protrusions are provided on a same plane.
13. The molded resin product according to claim 1, wherein the second protrusions include a first second-protrusion and a second second-protrusion, and
    wherein a height of the first second-protrusion is different from a height of the second second-protrusion.
14. A method for manufacturing the molded resin product according to claim 1, wherein the first protrusions and the second protrusions are formed by a transfer molding method using a mold.
15. A mold comprising a molding surface, wherein the molding surface has first recesses and second recesses, the first recesses being provided for forming the first protrusions of the molded resin product according to claim 1, the second recesses being provided for forming the second protrusions of the molded resin product.
16. An apparatus for manufacturing a molded resin product, the apparatus comprising the mold according to claim 15.
17. A camera comprising the molded resin product according to claim 1.
18. A printer comprising the molded resin product according to claim 1.

* * * * *